United States Patent
Venkata (10) Patent No.: US 10,545,778 B1
(45) Date of Patent: Jan. 28, 2020

(54) SOFTWARE REDUNDANCY FOR NETWORK FUNCTIONS

(71) Applicant: Juniper Networks, Inc., Sunnyvale, CA (US)

(72) Inventor: Suresh Kumar Vinapamula Venkata, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 415 days.

(21) Appl. No.: 15/395,591

(22) Filed: Dec. 30, 2016

(51) Int. Cl.
*G06F 9/455* (2018.01)

(52) U.S. Cl.
CPC ............... *G06F 9/45558* (2013.01); *G06F 2009/45579* (2013.01)

(58) Field of Classification Search
CPC ............... G06F 9/45558; G06F 2009/45579
See application file for complete search history.

(56) References Cited

U.S. PATENT DOCUMENTS

| | | | |
|---|---|---|---|
| 10,409,633 B2* | 9/2019 | Tsirkin | G06F 9/45541 |
| 2008/0044181 A1 | 2/2008 | Sindhu | |
| 2016/0057075 A1* | 2/2016 | Parikh | H04L 47/762 709/226 |
| 2016/0234082 A1* | 8/2016 | Xia | H04L 41/5096 |
| 2016/0352578 A1* | 12/2016 | Chen | H04L 41/12 |
| 2017/0141944 A1* | 5/2017 | Lee | H04L 41/04 |
| 2018/0018244 A1* | 1/2018 | Yoshimura | G06F 13/00 |
| 2018/0121222 A1* | 5/2018 | Sharma | G06F 9/45558 |
| 2018/0173547 A1* | 6/2018 | Stokes | G06F 8/60 |
| 2018/0307539 A1* | 10/2018 | Celozzi | G06F 9/5077 |

FOREIGN PATENT DOCUMENTS

WO    WO-2018014933 A1 *  1/2018  ........... G06F 9/5077

OTHER PUBLICATIONS

Daniel P. Berrangé, "Open Stack Performance Optimization", KVM Forum 2014, Oct. 2014 (Year: 2014).*
Simon Grinberg, "CPU Pinning and NUMA Awareness in OpenStack", www.stratoscale.com/blog/openstack/cpu-pinning-and-numa-awareness/, Jun. 2016 (Year: 2016).*

(Continued)

*Primary Examiner* — Francisco J Aponte
*Assistant Examiner* — Kevin X Lu
(74) *Attorney, Agent, or Firm* — Shumaker & Sieffert, P.A.

(57) ABSTRACT

In general, techniques are described for providing software redundancy for Virtual Network Functions (VNF). In one example, a method includes, by a host process executed by an insertable service card of a network device, pinning, to a plurality of hardware-based processors, active threads of an active network function. The host process pins, to a single hardware-based processor, backup threads of a backup network function for the active network function, wherein the plurality of hardware-based processors does not include the single hardware-based processor. The host process pins, to the single hardware-based processor, management threads of the active and backup network functions. The single hardware-based processor executes the management threads of the active and backup network functions to cause the management thread of the backup network function to receive, from the management thread of the active network function, state data generated by the active threads.

21 Claims, 5 Drawing Sheets

(56) References Cited

OTHER PUBLICATIONS

U.S. Appl. No. 12/182,619, by Jerome P. Moisand, filed Jul. 30, 2008.
"Confirm the Oracle VM Server CPU Topology," Mokum Solutions, Inc., retrieved on Oct. 10, 2016, from http://mokumsolutions.com/confirm-oracle-vm-server-cpu-topology, 6 pp.
"Performance Best Practices for VMware vSphere 5.5," VMware, Inc., May 14, 2014, 90 pp.
Reyes et al., "POWER7 Virtualization Best Practice Guide Version 3.0," International Business Machines Corporation (IBM), retrieved on Oct. 10, 2016, 20 pp.
"7.14 Setting Hard Partitioning for Virtual Machine CPUs," Oracle Corporation, retrieved on Oct. 10, 2016, from https://docs.oracle.com/cd/E50245_01/E50249/html/vmcon-vm-pinning.html, 1 pp.
"PowerVM Editions overview," International Business Machines Corporation (IBM), Oct. 6, 2016, https://www.ibm.com/support/knowledgecenter/POWER8/p8ecu/p8ecu_arecupowervmeds.htm, 3 pp.
"Hard Partitioning with Oracle VM Server for x86," Oracle Corporation, White Paper, Jul. 2016, 7 pp.
"Ganeti CPU Pinning," Google Inc., retrieved on Oct. 10, 2016, from http://docs.ganeti.org/ganeti/2.9/html/design-cpu-pinning.html, 4 pp.
"Live Partition Mobility," International Business Machines Corporation (IBM), Jun. 2, 2016, https://www.ibm.com/support/knowledgecenter/POWER7/p7hc3/iphc3kickoff.htm, 1 pp.
"Hard Partitioning RAC and RAC One Node with Oracle VM," Mokum Solutions, Inc., retrieved Oct. 10, 2016, from http://mokumsolutions.com/hard-partitioning-rac-and-rac-one-node-oracle-vm, 3 pp.

\* cited by examiner

SOFTWARE REDUNDANCY FOR NETWORK FUNCTIONS

TECHNICAL FIELD

This disclosure generally relates to computer networks.

BACKGROUND

A computer network is composed of a set of nodes and a set of links that connect one node to another. For instance, a computer network may be composed of a set of routers while the set of links may be paths between the routers. When a first node in the network sends data traffic to a second node in the network, the message may pass through many links and many nodes. The set of links and nodes that the message passes through while traveling from the first node to the second node is referred to as a path through the network.

Software-defined networking (SDN) and Network Functions Virtualization (NFV) have revolutionized the traditional communication network architectures and have transformed the way communication service providers (CSPs) design their network infrastructure and services. NFV is a network architecture concept that uses the technologies of Information Technology virtualization to virtualize entire classes of network functions into building blocks that can be connected, or chained together, to create communication services.

SDN and NFV use standard virtualization technologies to virtualize entire classes of network functions that can be connected or chained together to create network services. The initial interest in introducing SDN and NFV into communication services has been driven by the desire to lower capital costs by replacing dedicated network hardware with generic x86 platforms, and to lower operating costs by leveraging cloud automation tools. As the revolution has progressed, focus has shifted towards a foundational transformation in managed communication services, a migration toward a telecommunication (telco) cloud, and the emergence of distributed virtualized infrastructures.

The NFV architecture includes multiple virtualized network functions (VNFs). A network operator may deploy NFV Infrastructure in the form of one or more computing devices to apply, to data traffic traversing a computer network, network functions such as firewall, carrier grade network address translation (CG-NAT), performance enhancement proxies for video, transport control protocol (TCP) optimization and header enrichment, caching, and load balancing. Each of these network functions may be performed by a virtualized network function, which may be executed by one or more virtual machines, containers, or other execution environment of the NFV Infrastructure. In this way, virtualized network functions may be executed by servers, switches, storage devices, and cloud computing infrastructure, instead of having custom hardware appliances for each network function.

In some example implementations, physical and/or virtual appliances are stitched together to form of service chains that provide network services to customer packet flows. In a typical network deployment, service nodes execute virtual machines (VMs) implementing virtual network functions (VNFs) to create a service chain providing the requisite network service. A VNF is typically "stateful" in that a state is generated for a first and subsequent packets of a packet flow, and the state determines how the VNF processes still further subsequent packets for that packet flow. "Checkpointing," or backing up the state of an active VNF to a backup VNF instance for the active VNF is important to maintain seamless service even in the event of failure of the active VNF.

SUMMARY

In general, the disclosure describes techniques for providing software redundancy for one or more virtual network functions (VNFs) executed by a service card of a network device. For example, a network device may include an insertable service card having a plurality of hardware-based processors that execute one or more processing threads to execute one or more active VNFs and respective backup VNFs to provide software redundancy for the active VNFs. The service card may provide such dedicated computing resources for the network device to ensure that the VNFs receive predictable and reliable resources of the network device.

In some examples, a subset of a plurality of hardware-based processors, e.g., a plurality of data processors, are allocated for active VNF packet processing, while one of the plurality of hardware-based processors not within the subset, e.g., the management processor, is allocated for VNF management and hypervisor activities. A first plurality of active processing threads is allocated to the execution of an active VNF instance. A host process or a hypervisor pins the first plurality of active processing threads to the data processors allocated for active VNF processing. A management thread for the active VNF instance is allocated to perform management tasks for the active VNF instance, such as transferring state data from the active VNF instance to a backup VNF instance. The host process or hypervisor pins the management thread to the management processor. A second plurality of processing threads are allocated to the execution of a backup VNF instance for the active VNF instance. The host process or hypervisor pins the second plurality of processing threads to the management processor, and the second plurality of processing threads are blocked from execution.

In response to detecting a failure of the active VNF instance, the host process or the hypervisor, for example, unpins, from the data processors allocated for active VNF processing, the first plurality of active processing threads allocated to the execution of the active VNF instance. The host process or hypervisor unpins the second plurality of processing threads allocated to the execution of the backup VNF instance from the management processor and pins the second plurality of processing threads to the data processors allocated for active VNF processing. Further, the host process or hypervisor unblocks the second plurality of threads to begin executing the backup VNF instance with the transferred state data. In this way, upon failure of the active VNF instance, the host process or hypervisor may activate the backup VNF instance such that interruption to the VNF may be reduced despite a failure of the previously-active VNF.

In this way, only the management thread pinned to the management processor consumes processing resources for backup tasks, such as transferring state data. The second plurality of processing threads, for example, is blocked from execution until failure of the active VNF instance is detected, and, moreover, are all pinned to the management processor to avoid using the run queue of any of the plurality of data processors. As a result, the processor allocation and thread pinning techniques described herein may improve utilization of hardware-based processing resources for a network device that executes one or more VNFs.

Furthermore, the techniques of the present disclosure provide for seamlessly performing an In-Service Software Upgrade (ISSU) of one or more network functions provided by the service card. In one example, in response to detecting that a software upgrade exists for a network function provided by the active VNF instance, the host process or the hypervisor, for example, performs the software upgrade on the second plurality of processing threads allocated to the execution of the backup VNF instance, such that the backup VNF instance possesses the software upgrade. Upon completing the software upgrade, the host process or the hypervisor unpins, from the data processors allocated for active VNF processing, the first plurality of active processing threads allocated to the execution of the active VNF instance. The host process or hypervisor unpins the second plurality of processing threads allocated to the execution of the backup VNF instance from the management processor and pins the second plurality of processing threads to the data processors allocated for active VNF processing. Further, the host process or hypervisor unblocks the second plurality of threads to begin executing the backup VNF instance with the transferred state data. In this way, the host process or hypervisor may perform an ISSU of the backup VNF instance and replace the outdated, active VNF instance with the upgraded backup VNF instance such that network functions provided by the VNFs remains uninterrupted during the software upgrade.

As an example illustration of the advantages of the techniques described herein, an additional service card dedicated to provide a redundant hardware environment for backup VNFs may be eschewed. For example, other systems may require a number "N" of service cards to provide "N" redundancy against hardware and software failures. Such systems require one service card to provide resources for the one or more VNFs, while N−1 service cards are maintained in a backup state (e.g., awaiting activation until a failure occurs. Thus, while the N−1 service cards are in the backup state, the resources of the N−1 service cards are not utilized. The techniques of the disclosure recognize that, statistically, software failures occur much more frequently than hardware failures. Thus, the techniques as described herein provide redundancy for failure scenarios (e.g., software failures) for the one or more VNFs without requiring additional service cards that would otherwise be under-utilized.

In one example, this disclosure describes a method comprising: by a host process executed by an insertable service card of a network device, pinning, to any of a plurality of hardware-based processors of the service card, active threads of an active network function; by the host process, pinning, to a single hardware-based processor of the service card, a plurality of backup threads of a backup network function for the active network function, wherein the plurality of hardware-based processors of the service card does not include the single hardware-based processor of the service card; by the host process, pinning, to the single hardware-based processor of the service card, a management thread of the active network function and a management thread of the backup network function; and executing, by the single hardware-based processor of the service card, the management thread of the active network function and the management thread of the backup network function to cause the management thread of the backup network function to receive, from the management thread of the active network function, state data generated by the active threads of the active network function.

In another example, this disclosure describes a network device comprising: a network interface card; an insertable service card coupled to the network interface card, the insertable service card comprising: a plurality of hardware-based processors; a single hardware-based processor; a host process configured for execution by the single hardware-based service card to: pin, to any of the plurality of hardware-based processors of the service card, active threads of an active network function; pin, to the single hardware-based processor of the service card, a plurality of backup threads of a backup network function for the active network function, wherein the plurality of hardware-based processors of the service card does not include the single hardware-based processor of the service card; and pin, to the single hardware-based processor of the service card, a management thread of the active network function and a management thread of the backup network function, wherein the management thread of the active network function and the management thread of the backup network function are configured for execution by the single hardware-based processor to cause the management thread of the backup network function to receive, from the management thread of the active network function, state data generated by the active threads of the active network function.

In another example, this disclosure describes a non-transitory computer-readable medium comprising instructions that, when executed, cause a host process configured for execution by an insertable service card of a network device to: pin, to any of a plurality of hardware-based processors of the service card, active threads of an active network function; pin to a single hardware-based processor of the service card, a plurality of backup threads of a backup network function for the active network function, wherein the plurality of hardware-based processors of the service card does not include the single hardware-based processor of the service card; pin to the single hardware-based processor of the service card, a management thread of the active network function and a management thread of the backup network function; and execute the management thread of the active network function and the management thread of the backup network function to cause the management thread of the backup network function to receive, from the management thread of the active network function, state data generated by the active threads of the active network function.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
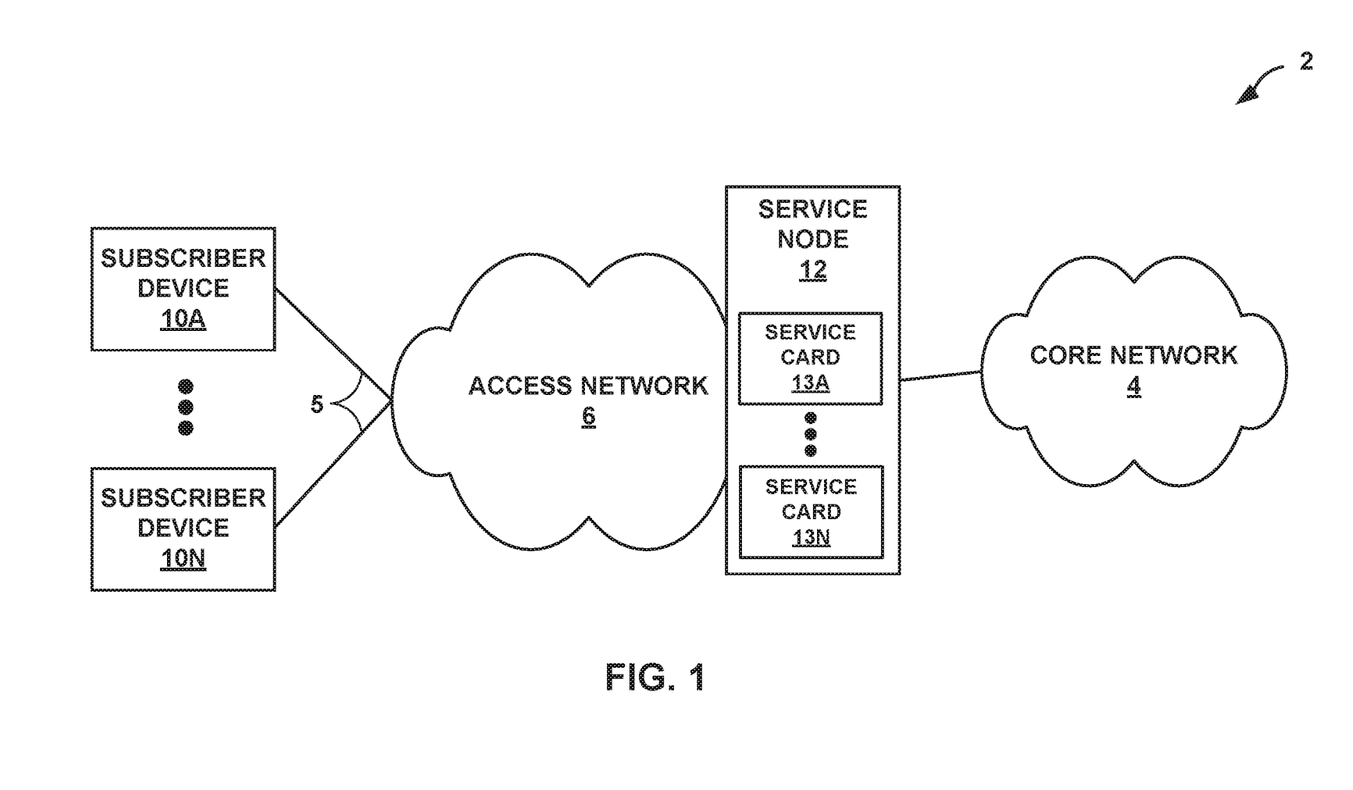
FIG. 1 is a block diagram illustrating an example service provider (SP) network in which service node includes a plurality of service cards, each service card providing software redundancy for at least one network function, in accordance with the techniques of the disclosure.

FIG. 1 is a block diagram illustrating an example service provider (SP) network 2 in which service node 12 includes a plurality of service cards 13A-13N, each service card providing software redundancy for at least one network function, in accordance with the techniques of the disclosure. Service node 12 is upstream (i.e., core side) of access network 6 and provides components necessary for receiving and terminating subscriber-specific connections so as to produce packet-based communications. However, service node 12 may be located within core network 4, access network 6, another edge network of service provider network 2, such as a data center and/or services complex.

Subscriber devices 10A-10N ("subscriber devices 10") may attach to SP network 2 via access network 6 to obtain services offered by SP network 2 to subscribers. Subscriber devices 10 may each comprise, for example, a mobile phone, a smart phone, a desktop/laptop computer, a gaming console, a video-conferencing suite, a workstation, a wireless device, a network-ready appliance, a file server, print server, a digital subscriber line (DSL) router, a cable modem, or another device with which to access services of SP network 2. A subscriber may represent, for instance, an enterprise, a residential subscriber, or a mobile subscriber. Subscriber devices 10 connect to access network 6 via access links 5 that may each comprise wired and/or wireless communication links. The term "communication link," as used herein, comprises any form of transport medium, wired or wireless, and can include intermediate nodes such as network devices. Each of access links 5 may include, for instance, aspects of an asymmetric DSL network, WiMAX, a T-1 line, an Integrated Service Digital Network (ISDN), or wired Ethernet.

Access network 6 aggregates data traffic from one or more subscribers for transport to/from core network 4 of SP network 2. Access network 6 includes network nodes (not shown in FIG. 1) that execute communication protocols to transport control and user data to facilitate communication between subscriber devices 10 and core network 4. Access network 6 may comprise, for example, digital subscriber line access multiplexers (DSLAMs), switches, edge routers, broadband remote access servers (BRAS), a gateway general packet radio service (GPRS) support node (GGSN) and other GPRS support node (GSNs), a Universal Mobile Telephone System (UMTS) having a UMTS Terrestrial Radio Access Network (UTRAN), and/or a 3GPP Long Term Evolution (LTE) mobile access network employing, for instance, service gateways (SGWs), packet data network gateways (PDNs), and eNodeBs, a mobile IP network, an IP network, or another type of network that provides access for subscribers 10 to core network 4. The elements of access network 6 may support a variety of protocols, such as Internet Protocol (IP), Frame Relay, Asynchronous Transfer Mode (ATM), Ethernet, Point-to-Point Protocol (PPP), Point-to-Point Protocol over Ethernet (PPPoE), GPRS tunneling protocol (GTP), and virtual local area network (VLAN)-related protocols, among others. Subscriber devices 10 may each have a dedicated subscriber interface, e.g., an ATM virtual circuit (VC) or an Ethernet virtual local area network (VLAN), to access network 6. Access network 6 may represent a customer site for a customer of the operator of SP network 2.

Core network 4 may represent a public network that is owned and operated by a service provider to interconnect a plurality of networks, such as access network 6. Core network 4 may implement Multi-Protocol Label Switching (MPLS) forwarding and in such instances may be referred to as an MPLS network. In some instances, core network 4 represents a plurality of interconnected autonomous systems, such as the Internet, that offers services from one or more service providers.

In some instances, transport links couple service node 12 to access network 6 and core network 4. Service node 12 may be considered as located "behind" the access network. All network traffic exchanged between access network 6 and core network 4 traverses service node 12. Service node 12 may constitute a part of a backhaul network, which may include land-based transmission lines, frequently leased by a service provider, to transport data and control traffic between access network 6 and core network 4. The backhaul network typically also includes switches, aggregation devices, and routers. Service node 12 may comprise a network edge or core router that routes network packets to/from access network 6, or service node 12 may comprise an intermediate network device that transports packets between access network 6 and core network 4. In some embodiments, service node 12 comprises an MX-series router manufactured by Juniper Networks, Inc., of Sunnyvale, Calif. Various embodiments of SP network 2 may include additional service nodes.

Service node 12 may also represent an access gateway, a layer three network edge device that manages subscriber attachment sessions and routes subscriber data traffic to/from core network 4. In such instances, service node 12 authenticates or receives authentication for subscriber device 10, authorizes the devices to access core network 4, and may provide network configuration information to the devices. When one of subscriber devices 10 attempt to attach to core network 4, service node 12 may authenticate the device by interfacing to a server using a AAA protocol, such as Remote Authentication Dial-In User Service (RADIUS) or the Diameter protocol, to authenticate the subscriber device or a user thereof. Service node 12 in such instances may comprise, for example, a GGSN, an edge router such as a BRAS, a CMTS, or another network device.

In some embodiments, service node 12 comprises a switching device that forwards layer two (L2) traffic based on, for example, MAC layer addresses. L2 traffic may include Ethernet frames addressable by MAC layer addresses that may be used, in accordance with the techniques described herein, to identify a subscriber or subscriber class.

A network service provider that administers and operates SP network 2 may offer network services on a per-subscriber or per-customer-site basis to subscriber devices 10 that access the service provider network. Network functions that make up network services may include firewall, carrier grade network address translation (CG-NAT), media optimization (voice/video), WAN optimization, NAT44, NAT64, HTTP header enrichment functions, TCP optimizers, IPSec/VPN services, deep packet inspection (DPI), HTTP filtering, counting, accounting, charging, and load balancing of packet flows, and application-level gateways (ALGs) as well as complex network functions such as Service Gateways, broadband network gateways (BNGs), and Packet Data Network Gateways (PGWs).

Any one of subscriber devices 10 may begin exchanging data packets with core network 4, and such packets traverse service node 12 as members of at least one packet flow. The term "packet flow" refers to a set of packets originating from a particular source device and sent to a particular destination device as part of an application communication session between the source and destination device. A flow of packets, in either the upstream (sourced by subscriber devices 10) or downstream (destined for subscriber devices 10) direction, may be identified by the five-tuple: <source network address, destination network address, source port, destination port, protocol>. This five-tuple generally identifies a packet flow to which a received packet corresponds and, depending on the flow direction, a subscriber may be associated with either the source network address or the destination network address of the flow. In some instances, access network 6 may overload the five-tuple or a subset thereof with packet flows for multiple different subscribers and/or with multiple packet flows for the same subscriber. For example, subscriber device 10A may establish multiple traffic bearers to service node 12 each having distinct QoS parameters that correspond with the service being born, e.g., VoIP or bulk data transfer. Packet flows may therefore also be characterized and identified according to other characteristics, including VLAN tags, PPPoE session, and GTP tunnel identifiers of network layer or data link layer protocol headers/tags that encapsulate the packets. Service node 12 may identify an application using deep packet inspection (DPI).

Service node 12 includes a plurality of service cards 13A-13N (collectively, "service cards 13" or "line cards 13"). Service cards 13 decouple hardware and software functions of service node 12 into individual field-upgradeable units so as to provide modular processing and modular storage. For example, each of service cards 13 is a router or switch that includes a multi-core computing environment comprising a plurality of hardware-based CPUs. Each of service cards 13 further execute at least one virtual network function (VNF) for network services for any of subscriber devices 10A-10N.

According to the techniques of the disclosure, each service card 13 executes, on the plurality of hardware-based CPUs, one or more processing threads to execute one or more active VNFs and respective backup VNFs to provide software redundancy for the active VNFs. Each service card 13 provides such dedicated computing resources for the service node 12 to ensure that the VNFs receive predictable and reliable resources of the service node 12.

In some examples, a subset of the plurality of hardware-based processors of, e.g., service card 13A (referred to herein as a plurality of "data processors"), are allocated for active VNF packet processing. Further, one of the plurality of hardware-based processors not within the subset (referred to herein as a management processor), is allocated for VNF management and hypervisor activities. The service card 13A allocates a first plurality of active processing threads to the execution of an active VNF instance. A host process or a hypervisor of the service card 13A pins the first plurality of active processing threads to the data processors allocated for active VNF processing. Further, the service card 13A allocates a management thread for the active VNF instance to perform management tasks for the active VNF instance, such as transferring state data from the active VNF instance to a backup VNF instance. The host process or hypervisor of the service card 13A pins the management thread to the management processor. The service card 13A allocates a second plurality of processing threads to the execution of a backup VNF instance for the active VNF instance. The host process or hypervisor of the service card 13A pins the second plurality of processing threads to the management processor and blocks the second plurality of processing threads from execution.

In response to detecting a failure of the active VNF instance, the host process or the hypervisor of the service card 13A unpins, from the data processors allocated for active VNF processing, the first plurality of active processing threads allocated to the execution of the active VNF instance. The host process or hypervisor of the service card 13A unpins the second plurality of processing threads allocated to the execution of the backup VNF instance from the management processor and pins the second plurality of processing threads to the data processors allocated for active VNF processing. Further, the host process or hypervisor of the service card 13A unblocks the second plurality of threads to begin executing the backup VNF instance with the transferred state data. In this way, upon failure of the active VNF instance, the host process or hypervisor of the service card 13A may activate the backup VNF instance such that network functions provided by the VNFs remains uninterrupted.

In this way, only the management thread pinned to the management processor of the service card 13A consumes processing resources for backup tasks, such as transferring state data. The second plurality of processing threads, for example, is blocked from execution until failure of the active VNF instance is detected, and, moreover, the second plurality of processing threads are all pinned to the management processor of the service card 13A to avoid using the run queue of any of the plurality of data processors of the service card 13A. As a result, the processor allocation and thread pinning techniques described herein may improve utilization of hardware-based processing resources for a network device that executes one or more VNFs.

Furthermore, the techniques of the present disclosure may be used to perform an ISSU of one or more active VNFs. For example, in response to detecting that a software upgrade exists for the active VNF instance, the host process or the hypervisor of the service card 13A instead performs the software upgrade on the backup VNF instance. Upon completing the software upgrade, host process or the hypervisor of the service card 13A unpins, from the data processors allocated for active VNF processing, the first plurality of active processing threads allocated to the execution of the active VNF instance. The host process or hypervisor of the service node 13A unpins the second plurality of processing threads allocated to the execution of the backup VNF instance from the management processor and pins the second plurality of processing threads to the data processors allocated for active VNF processing. Further, the host process or hypervisor of the service card 13A unblocks the second plurality of threads to begin executing the backup VNF instance with the transferred state data. In this way, the host process or hypervisor may perform an ISSU of the backup VNF instance and replace the outdated, active VNF instance with the upgraded backup VNF instance such that functions provided by the VNFs remains uninterrupted during the software upgrade.

Figure 2:
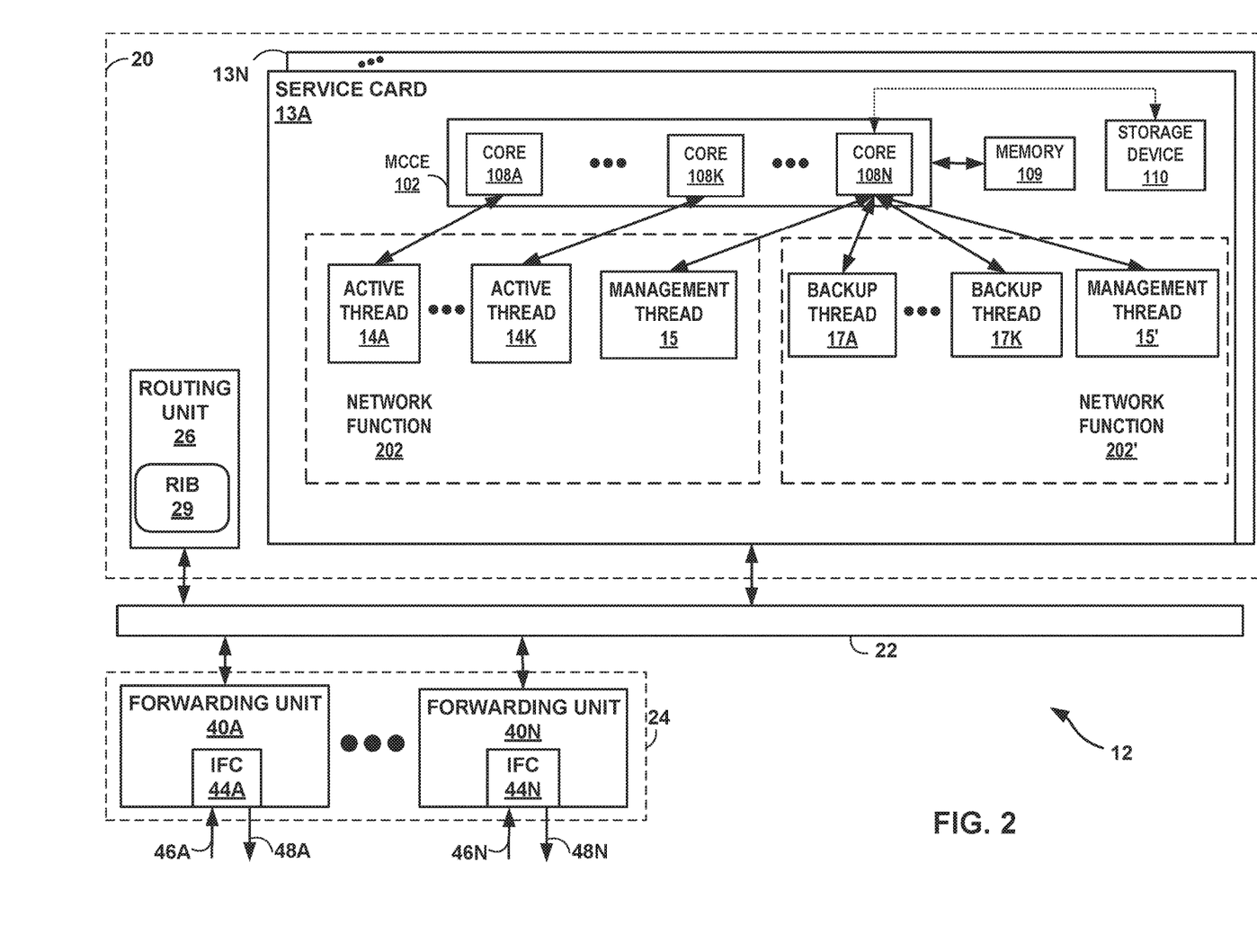
FIG. 2 is a block diagram illustrating the example service node of FIG. 1, in accordance with the techniques of the disclosure.

FIG. 2 is a block diagram illustrating, in further detail, an example implementation of service node 12 of FIG. 1, in accordance with the techniques of the disclosure. In this example, service node 12 is divided into two logical or physical "planes" to include a first control plane 20 and a second "data" or "forwarding" plane 24. That is, service node 12 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 20 is a decentralized control plane in that control plane functionality is distributed among routing unit 26 and a plurality of service cards 13A-10K ("service cards 13"). Service cards 13 may implement a service plane. Similarly, data plane 24 in this example is a decentralized data plane in that data plane functionality and packet forwarding functionality is distributed among a plurality of forwarding units 40A-40N ("forwarding units 40"). Each of routing unit 26, service cards 13, and forwarding units 40 may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively, or additionally, each of routing unit 26, service cards 13, and forwarding units 40 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Switch 22 couples routing unit 26, subscriber management service units 10, and forwarding units 40 to deliver data units and control messages among the units. Switch 22 may represent an internal switch fabric or cross-bar, bus, or link. Examples of high-speed multi-stage switch fabrics used as a forwarding plane to relay packets between units within a router are described in U.S. Patent Application 2008/0044181, entitled MULTI-CHASSIS ROUTER WITH MULTIPLEXED OPTICAL INTERCONNECTS. The entire contents of U.S. Patent Application 2008/0044181 are incorporated herein by reference.

Routing unit 26 executes the routing functionality of service node 12. In this respect, routing unit 26 represents hardware or a combination of hardware and software of control that implements routing protocols (not shown in FIG. 2) by which routing information stored in a routing information base 29 ("RIB 29") may be determined. RIB 29 may include information defining a topology of a network. Routing unit 26 may resolve the topology defined by routing information in RIB 29 to select or determine one or more routes through the network. Routing unit 20 may then update data plane 24 with these routes, where forwarding units 40 of data plane 24 store these routes as respective forwarding information bases. Further details of one example embodiment of a router can be found in U.S. patent application Ser. No. 12/182,619, filed Jul. 30, 2008 entitled "STREAMLINED PACKET FORWARDING USING DYNAMIC FILTERS FOR ROUTING AND SECURITY IN A SHARED FORWARDING PLANE," and issued as U.S. Pat. No. 8,339,959 on Dec. 25, 2012, which is incorporated herein by reference.

Data plane (alternatively, "forwarding plane") 24 represents hardware or a combination of hardware and software that forward network traffic in accordance with forwarding information. In the example of service node 12 of FIG. 2, data plane 24 includes forwarding units 40 that provide high-speed forwarding of network traffic received by interface cards 44A-44N ("IFCs 44") via inbound links 46A-46N to outbound links 48A-48N. Forwarding units 40 may each comprise one or more packet forwarding engines ("PFEs") coupled to respective interface cards 44 and may represent, for example, a dense port concentrator (DPC), modular port concentrator (MPC), flexible physical interface card (PIC) concentrator (FPC), or another line card, for example, that is insertable within a service node 12 chassis or combination of chassis.

Service cards 13 of control plane 20 may comprise flexible programmable integrated circuit (PIC) concentrators (PFCs), dense port concentrators (DPCs), modular port concentrators (MPCs), or another type of network device, such as a switch. Service card 13A, e.g., includes a multi-core computing environment 102 that includes a plurality of CPU processors or cores 108A-108N (collectively, "cores 108"), where "N" is an integer greater than one. Service cards 13 may each represent, for example, a packet forwarding engine (PFE) or a component of physical interface card insertable within a chassis of service node 12. The physical interface card may be, for instance, a multi-services dense port concentrator (MS-DPC). Service cards 13 may also each represent a co-processor executing on a routing node, such as routing unit 26. Service cards 13 may be alternatively referred to as "service PICs." Each of service cards 13 includes substantially similar components to perform substantially similar functionality, said components and functionality being described hereinafter with respect to service card 13A.

Multi-core computing environment 102 of service card 13A may include any number of processors and any number of hardware cores from, for example, four to thousands. Each of processing cores 108 each includes an independent execution unit to perform instructions that conform to an instruction set architecture for the core. Processing cores 108 may each be implemented as separate integrated circuits (ICs) or may be combined within one or more multi-core processors (or "many-core" processors) that are each implemented using a single IC (i.e., a chip multiprocessor), package, or die. Alternatively, or in addition, multi-core computing environment 102 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Memory 109 may in some examples present a non-uniform memory access (NUMA) architecture to multi-core computing environment 102. That is, cores 108 may not have equal memory access time to the various storage media that constitute memory 109. Cores 108 may be configured in some instances to use the portions of memory 109 that offer the lowest memory latency for the cores to reduce overall memory latency. Examples of memory 109 include non-transitory computer-readable mediums including memory such as random-access memory (RAM) (including various forms of dynamic RAM (DRAM), e.g., DDR2 SDRAM, or static RAM (SRAM)), and Flash memory.

Storage device 110 is a form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Examples of storage device 110 include a storage device (e.g., a disk drive, or an optical drive).

Multi-core computing environment 102, memory 109, and storage device 110 provide an operating environment for a software stack (not shown in FIG. 2) that executes one or more VNFs for providing one or more functions. In some examples, the operating environment executes one or more Virtual Machines (VMs) or containers (also not shown in FIG. 2), each of which executes a single instance of a VNF.

Active processing threads 14A-14K ("active threads 14") executed by cores 108 provide a network function 202 for service node 12. Similarly, backup processing threads 17A-17K ("backup threads 17") executed by cores 108 that provide a backup network function 202' for service node 12, the backup network function 202' operating a standby instance of the network function 202. Each network function 202, 202' further includes a corresponding management processing thread 15, 15' for handling management functions of the network function 202, 202', such as checkpointing and transferring state data of the network function 202, 202'.

According to the techniques of the disclosure, a subset of cores 108A-108K (e.g., the "data processors 108"), are allocated for active VNF packet processing. Further, one of cores 108N not within the subset (e.g., the "management processor 108"), is allocated for VNF management and hypervisor activities. Service card 13A pins the one or more active processing threads 14 of the active network function 202 to the data processors 108 (e.g., cores 108A-108K). Service card 13A pins the management thread 15 for the active network function 202 and the management thread 15' for the backup network function 202' to the management processor 108N. Further, service card 13A pins the one or more backup processing threads 17A-17K for the backup network function 202' to the management processor 108N and blocks the one or more backup processing threads 17 from execution.

In this way, only management threads 15, 15' pinned to the management processor 108N consume processing resources of backup tasks, such as transferring state data from a memory space of the active network function 202 to a memory space of the backup network function 202'. The network functions 202, 202' may store state data to storage device 110. The backup threads 17, for example, are blocked from execution until failure of the active network function 202 is detected, and, moreover, are all pinned to the management processor 108N to avoid using the run queue of any of the plurality of data processors 108 and the management process 108N. As a result, the processor allocation and thread pinning techniques described herein may improve utilization of hardware-based processing resources for a network device that executes one or more VNFs.

Figure 3:
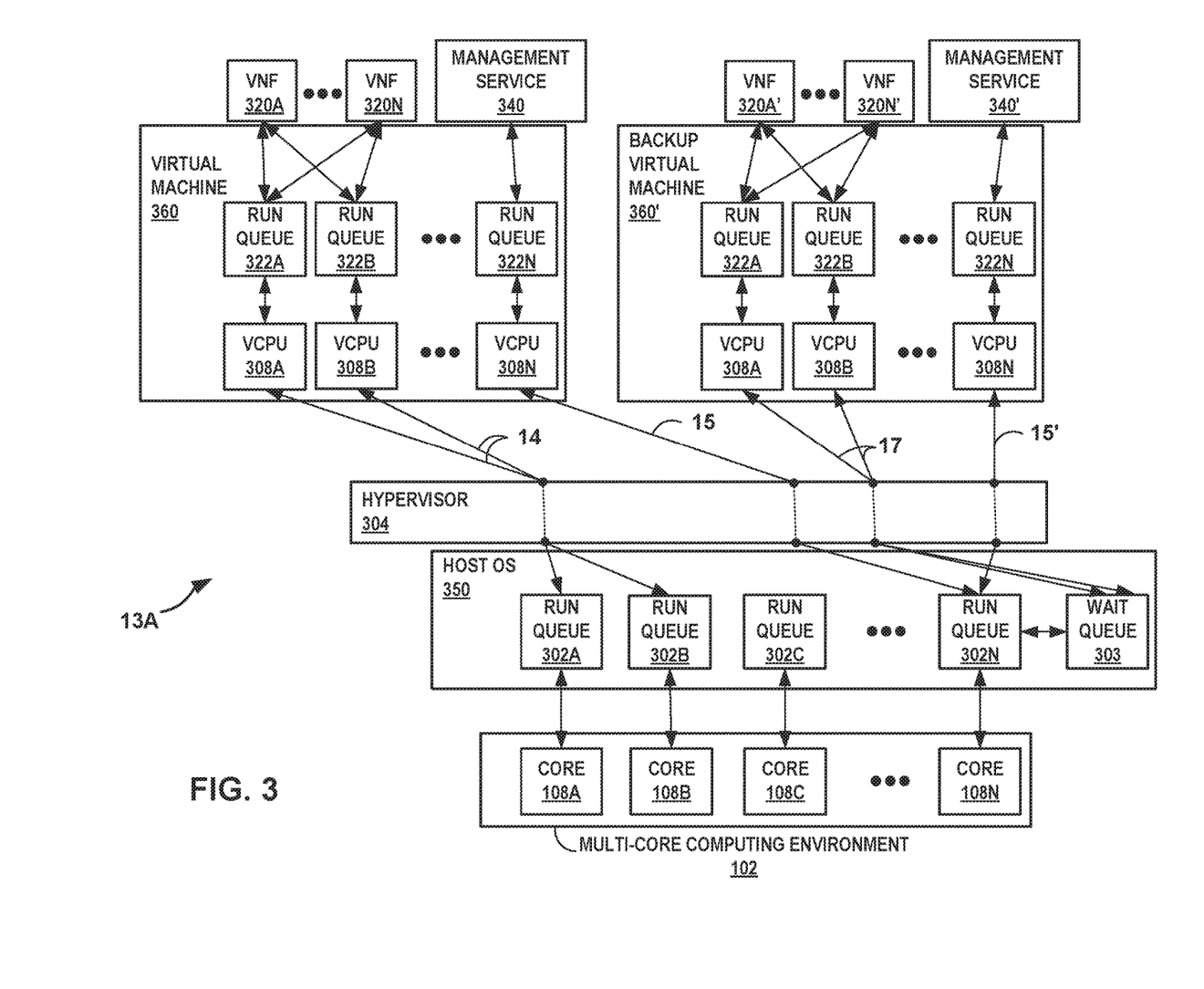
FIG. 3 is a block diagram illustrating an example software architecture for the example service card of FIG. 1, in accordance with the techniques of the disclosure.

FIG. 3 is a block diagram illustrating an example software architecture for a service card in further detail, in accordance with techniques of the disclosure. In the example of FIG. 3, service card 13A includes multi-core computing environment 102 which executes a host operating system (OS) 350. Host OS 350 executes a hypervisor 304, which in turn manages one or more VMs 360. Each VM 360 executes one or more VNFs 320A-320N (collectively, "VNFs 320"), which each provide a network function and a management service 340 for performing management services for VMs 360 and VNFs 320. Host OS 350 further executes a plurality of backup VMs 360' that execute one or more backup VNFs 320A'-320N' (collectively, "backup VNFs 320'") and a management service 340' for performing various management services for VMs 360' and VNFs 320'.

Host OS 350 may execute in kernel space and may include, for example, a Linux, Berkeley Software Distribution (BSD), another Unix-variant kernel, or a Windows server operating system kernel, available from Microsoft Corp. Host OS 350 provides an API for interfacing hypervisor 204 with bare-metal processors, such as cores 108 of multi-core computing environment 102.

Host OS 350 further provides a plurality of run queues 302A-302N (collectively, "run queues 302") corresponding to the plurality of cores 108. Each run queue 302 allows a corresponding core 108 to perform multitask execution of a plurality of tasks by providing a queue for storing pending tasks for a plurality of threads, such as active processing threads 14, management thread 15, and backup processing threads 17. Each core 108 may be capable of executing only a single task at a time. In an architecture that implements preemption, each core 108 executes a task in a corresponding run queue 302 for a predetermined amount of time (e.g., a "time slice"). After the time slice expires, core 108 interrupts the task currently being executed and enqueues the task in the corresponding run queue 302 for execution at a later time. The core 108 dequeues a subsequent task from the corresponding run queue 302, and executes the subsequent task for the time slice. Such changes of the executed task are known as context switches. Context switches are performed by a preemptive scheduler for the core 108, which has the power to preempt, or interrupt, and later resume, other tasks in the system. In some examples, a context switch for a core 108 may satisfy other constraints of the system, such as to satisfy priority requires (e.g., to switch from a low-priority task to a high-priority task).

Hypervisor 304 provides a virtualization platform that allows multiple operating systems (e.g., VMs 360) to concurrently on service card 13A. Hypervisor 304 provides VMs 360, 360' with a guest operating system and a virtual operating platform. Hypervisor 304 further manages the execution of the guest operating systems of VMs 360, 360'. Hypervisor 304 allows for multiple instances of a variety of operating systems to share virtualized hardware resources on a single physical machine. Example hypervisors include Kernel-based Virtual Machine (KVM) for the Linux kernel, Xen, ESXi available from VMware, Windows Hyper-V available from Microsoft, and other open-source and proprietary hypervisors. Hypervisor 304 may represent a virtual machine manager. While the example of FIG. 3 depicts a hypervisor and VMs, the functions of hypervisor 304 may also be implemented using a container architecture executing on a shared kernel, such as a Docker container.

Each VM 360, 360' executes within hypervisor 304. In the example of FIG. 3, each VM 360, 360' provides an environment for the execution of a plurality of VNFs 320, 320'. In general, each VM 360, 360' may be any type of software application and is assigned a virtual address for use within a corresponding virtual network. A VM 360, 360' may be assigned its own virtual layer three (L3) IP address, for example, for sending and receiving communications but is unaware of an IP address of the physical server on which the virtual machine is executing. In this way, a "virtual address"

is an address for an application that differs from the logical address for the underlying, physical computer system, e.g., service card 13A, in the examples of FIGS. 1-2.

The environment that VM 360, 360' provides to VNFs 320, 320' includes a virtual application space, one or more virtual CPUs 308A-308N (collectively "vCPUs 308") and a virtual run queue 322A-322N (collectively, "virtual run queues 322"). Each vCPU 308 is an abstraction of a physical core 108 that VNFs 320, 320' may use for execution. Hypervisor 304 maps each vCPU 308 to at least one physical core 108. Typically, the number of vCPUs 308 are equal to or less than the number of physical cores 108. Thus, each VNF 320, 320' enqueues tasks to virtual run queues 322. Each vCPU 308 operates performs multithreaded execution of the tasks of each VNF 320, 320' (e.g., each vCPU 308 retrieves tasks from a corresponding virtual run queue 322 for execution for a time slice). In one example, each vCPU executes natively as a thread 14, 15, 17 on a corresponding physical core 108, or is enqueued through hypervisor 304 in a corresponding run queue 302 as a task for execution by physical core 108. Hypervisor 304 may further include a wait queue 303 for storing blocked threads, such that the blocked threads do not take space in run queues 302 and are not executed by cores 108.

As described herein, "pinning" refers to an assignment, by hypervisor 204 or in some cases another process, of a CPU affinity for vCPUs 308 of VMs 360, 360'. In other systems, by default, each thread has CPU affinity for all physical CPUs in the system. Thus, the task scheduler may assign any thread to any physical CPU for execution, based on the scheduling considerations of the system. Additionally, the task scheduler may migrate threads from one physical CPU to another to increase efficiency. Typically, however, the task scheduler attempts to minimize migrations to avoid penalties incurred by refreshing a cache of a destination CPU, as compared to the origin CPU. By "pinning" a thread to a CPU (e.g., by setting a CPU affinity for the thread), the task scheduler is instructed to prefer or to only schedule the thread on a single CPU or predefined set of CPUs, as opposed to any available CPU.

Modern architectures typically contain multiple cores, each having multiple logical processors. Each of the CPUs within a single core may share caches and execution resources, such as an execution engine, a system bus interface, instruction fetch and decode units, branch predictors, etc. Thus, each CPU within a single core may not be independent from the other CPU of the same core. Accordingly, to avoid resource starvation of the VMs of a system, the number of VMs executing on a system is typically less than or equal to the number of physical CPUs of the system. Further, where a VM is assigned to more than one CPU, the VM is typically assigned to CPUs belonging to different cores to avoid the situation where all of the CPUs to which a VM is assigned share the same core, and thus share resources with each other, which may negatively impact the resources available to the VM.

According to the techniques of the disclosure, hypervisor 304 allocates a first plurality of active processing threads 14 for the execution of one or more VNFs 320 that provide one or more network functions (e.g., perform active packet processing for service card 13). Hypervisor 304, or in some cases another process, pins the first plurality of active processing threads 14 to a subset of the plurality of physical cores 108. In the example of FIG. 3, multi-core computing environment includes "N" cores 108, with cores 108A-108C allocated for data processing (e.g., data processors 108A-108C). VM 360 executes VNFs 320 providing the one or more network functions. Hypervisor 304 allocates threads 14 associated with VM 360 and pins threads 14 to run queue 302A-302C and cores 108A-108C. Thus, VNFs 320 of VM 360 are pinned to data processors 108A-108C for active VNF processing.

Further, for each VM 360, 360', hypervisor 304 allocates a management thread 15, 15' for execution of management services 340, 340'. In some examples, management services 340, 340' perform management tasks for VNFs 320, 320', such as transferring state data from the active VNF instances 320 to backup VNF instances 320'. Hypervisor 304 pins the management threads 15 to the management processor 108. In the example of FIG. 3, core 108N of multi-core computing environment is allocated for management functions (e.g., management processor 108N). Thus, hypervisor 304 pins management threads 15, 15' to management processor 108N.

Hypervisor 304 further allocates a second plurality of processing threads 17 to the execution of backup VNF instance 320A'-320N' (collectively, (backup VNFs 320') for each of the active VNF instances 320. Hypervisor 304 pins the second plurality of processing threads 17 to the management processor 108 and blocks the second plurality of processing threads from execution. With respect to the foregoing example, hypervisor 304 allocates a plurality of threads 17 associated with a plurality of backup VMs 360' executing VNFs 320' for providing backup network functions to VNFs 320 of VM 360, e.g., backup VPN, VoIP, and HTTP filtering services. Hypervisor 304 pins each of processing threads 17 to management processor 108N and blocks each of processing threads 17 from execution.

In response to detecting a failure of one or more active VNF instances 320, hypervisor 304 unpins, from the data processors 108 allocated for active VNF processing, the first plurality of active processing threads 14 allocated to the execution of the active VNF instance 320. For example, with respect to FIG. 3, hypervisor 304 detects a failure of one or more VNFs 320 of VM 360. In response to detecting the failure, hypervisor 304 unpins, from data processors 108A-108C, active processing threads 14 associated with VNFs 320 of VM 360. In some examples, hypervisor 304 deallocates from memory VM 360 and VNFs 320 of VM 360. In other examples, hypervisor 304 pins the active processing threads 14 to management processor 108N and blocks the active processing threads 14 from execution.

Further, hypervisor 304 unpins the second plurality of processing threads 17 allocated to the execution of the backup VNF instance 320' from management processor 108N and pins the second plurality of processing threads 17 to the data processors 108A-108C allocated for active VNF processing. Further, the host process or hypervisor of the service card 13 unblocks the second plurality of threads 17 to begin executing the backup VNF instance with the transferred state data. For example, with respect to FIG. 3, suppose that the failed active VNFs 320 of VM 360 provided a VPN service. Therefore, hypervisor 304 unpins, from management processor 108N, a plurality of backup VNF instances 320' of backup VM 360' that provide a backup VPN service. Hypervisor 304 pins the plurality of backup VNF instances 320' of backup VM 360' that provide the backup VPN service to data processors 108A-108C. Further, the host process or hypervisor of the service card 13 unblocks the plurality of backup VNF instances 320' of backup VM 360', now pinned to data processors 108A-108C, such that backup VNF instances 320' resume execution with transferred state data from failed active VNFs 320 of VM 360. In this way, in response to detecting a failure of an active VNF 320 of VM 360, hypervisor 304 may activate the corresponding backup VNF instance 320' such that network functions provided by service card 13A (e.g., VPN services provided by failed active VNFs 320 of VM 360) remains uninterrupted.

As described herein, only management threads 15, 15' pinned to management processor 108N consumes processing resources for backup tasks, such as transferring state data. In some examples, management threads 15, 15' periodically transfers state data from ones of active VNF instances 320 to corresponding ones of backup VNF instance 320' (also referred to herein as "checkpointing"). In this fashion, management threads 15, 15' ensures that each backup VNF instance 320' remains synchronized with a corresponding active VNF instance 320. Thus, upon failure of an active VNF instance 320, a corresponding backup VNF instance 320' may resume the responsibilities of the failed active VNF instance 320 such that no interruption in the network function provided by the failed active VNF instance 320 occurs, and further, that no loss in traffic data or packets occurs.

Furthermore, the backup processing threads 17 of backup VNF instances 320', for example, are blocked from execution until failure of one or more active VNF instances 320 is detected so as to consume no processing resources. In one example, the backup processing threads 17 are inserted into a wait queue 303 instead of run queue 302, such that the backup processing threads 17 are stored, instead of being passed to the core 108N for execution. Moreover, the backup processing threads 17 are all pinned to management processor 108N so as to avoid using any of run queues 302A-302C of any of the plurality of data processors 108A-108C of the service card 13. As a result, the processor allocation and thread pinning techniques described herein may improve utilization of hardware-based processing resources for a network device that executes one or more VNFs.

Furthermore, the techniques of the present disclosure may be used to perform an ISSU of one or more active VNFs 320 and VMs 360. In response to detecting that a software upgrade exists for a network function provided by one or more active VNF instances 320, hypervisor 304 performs the software upgrade on the backup VNF instance 320'. For example, with respect to FIG. 3, hypervisor 304 detects that a software upgrade exists for a VPN network function provided by VNFs 320 of VM 360. Hypervisor 304 performs the software upgrade on backup VNF instances 320' that provide backup VPN services to VNFs 320 of VM 360.

Upon completing the software upgrade of the backup VNF instances 320', hypervisor 304 unpins, from the data processors 108A-108C allocated for active VNF processing, the first plurality of active processing threads 14 allocated to the execution of the active VNF instance 320. For example, with respect to FIG. 3, upon completing the software upgrade of backup VNF instances 320', hypervisor 304 unpins, from data processors 108A-108C, active processing threads 14 associated with VNFs 320 of VM 360 that provide the VPN service. In some examples, hypervisor 304 deallocates from memory VM 360 and VNFs 320 of VM 360. In other examples, hypervisor 304 pins the active processing threads 14 to management processor 108N and blocks the active processing threads 14 from execution.

Further, hypervisor 304 unpins the second plurality of processing threads 17 allocated to the execution of the upgraded backup VNF instance 320' from management processor 108N and pins the second plurality of processing threads 17 to the data processors 108A-108C allocated for active VNF processing. Further, the host process or hypervisor of the service card 13A unblocks the second plurality of threads 17 to begin executing the upgraded backup VNF instance with the transferred state data. For example, with respect to FIG. 3, hypervisor 304 unpins, from management processor 108N, the plurality of backup VNF instances 320' of backup VM 360' that provide the upgraded VPN service. Hypervisor 304 pins the plurality of backup VNF instances 320' of backup VM 360' that provide the upgraded VPN service to data processors 108A-108C. Further, the host process or hypervisor of the service card 13A unblocks the plurality of backup threads 17 of upgraded VNF instances 320' now pinned to data processors 108A-108C, such that upgraded VNF instances 320' resume execution with transferred state data from active VNFs 320 of VM 360. In this way, hypervisor 304 may perform an ISSU of backup VNFs 320' and then replace the outdated, active VNFs 320 with the upgraded backup VNFs 320' such that the network functions provided by the VNFs remains uninterrupted during the software upgrade.

Figure 4:
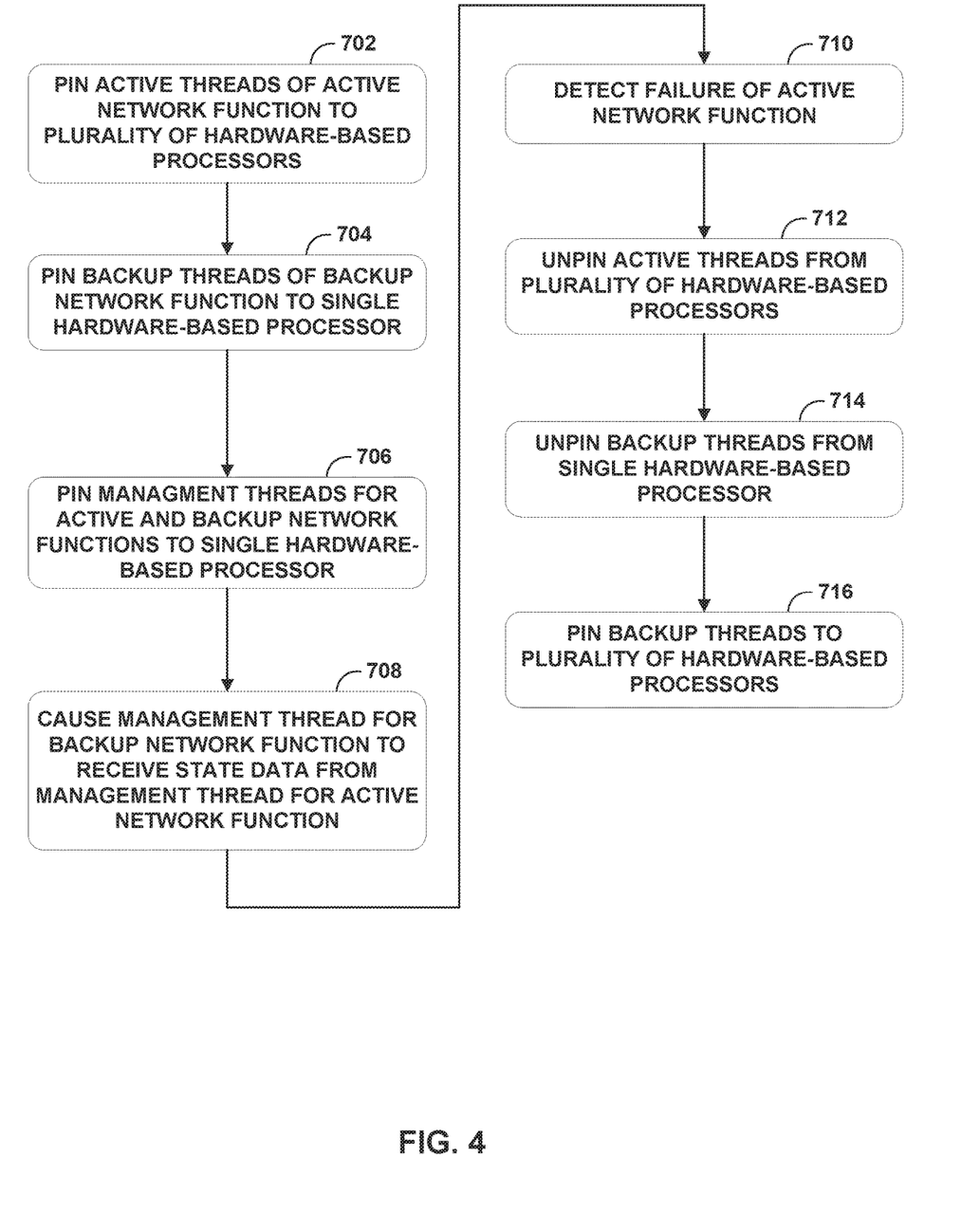
FIG. 4 is a flowchart illustrating an example operation for providing software redundancy for one or more network functions of a line card, in accordance with the techniques of the disclosure.

FIG. 4 is a flowchart illustrating an example operation for providing software redundancy for one or more network functions of a line card, in accordance with the techniques of the disclosure. The operation is described with respect to service card 13A of FIG. 3. In the example of FIG. 4, a host process or hypervisor pins active threads of the active network function to the plurality of hardware-based processors (702). In the example of FIG. 3, VNFs 320 executing by VMs 360 provide one or more network functions. Hypervisor 304 allocates a plurality of active processing threads 14 for the execution of active VNFs 320 that perform active packet processing for service card 13A. Hypervisor 304 pins the active processing threads 14 to a subset of the plurality of physical cores 108 (e.g., data cores 108A-108C allocated for data processing).

Further, the host process pins backup threads of the backup network function to the single hardware-based processor (704). In the example of FIG. 3, VNFs 320' executing within VMs 360' provide one or more backup network functions, which act to provide redundancy for the network functions 220 provided by VMs 320. Hypervisor 304 allocates a plurality of backup processing threads 17 for the execution of backup VNF instance 320'. Hypervisor 304 pins the plurality of backup processing threads 17 to the management processor 108N and blocks the plurality of backup processing threads from execution.

The host process pins management threads for active and backup threads to the single hardware-based processor (706). In the example of FIG. 3, hypervisor 304 allocates a management thread 15, 15' for execution of management services 340, 340'. Hypervisor 304 pins the management threads 15, 15' to the management processor 108N. Further, the host process executes the management thread of the active network function and the management thread of the backup network function to cause the management thread of the backup network function to receive, from the management thread of the backup network function, state data generated by the active threads of the active network function (708). For example, hypervisor 304 executes management threads 15, 15' such that management service 340 transfers state data from active VNFs 320 to management service 340', and management service 340' receives the state data and stores it for use by backup VNFs 320'.

In the situation where an active network function, such as active network function 202, suffers a failure, the host process or hypervisor 304 detects the failure of the active network function (710). In response to detecting the failure, the host process unpins the active threads from the plurality of hardware-based processors (712). In the example of FIG. 3, hypervisor 304 unpins, from data processors 108A-108C, active threads 14 executing the failed active network function provided by VNFs 320. In some examples, hypervisor 304 deallocates from memory VM 360 and VNFs 320 of VM 360.

Further, the host process unpins the backup threads from the single hardware-based processor (714). For example, hypervisor 304 unpins the backup threads 17 executing the backup network function provided by VNFs 320' from management processor 108N. The host process pins the backup threads to the plurality of hardware-based processors (716). For example, hypervisor 304 pins the backup threads 17 executing the backup network function provided by VNFs 320' to data processors 108A-108C. Hypervisor 304 unblocks the plurality of backup VNF instances 320' of backup VM 360', now pinned to data processors 108A-108C, such that backup VNF instances 320' resume execution with the transferred state data from failed active VNFs 320 of VM 360. In this way, upon failure of the active VNFs 320 of VM 360, hypervisor 304 may activate the backup VNF instances 320' such that network functions provided by service card 13A (e.g., the VPN services provided by failed active VNFs 320 of VM 360) remains uninterrupted.

Figure 5:
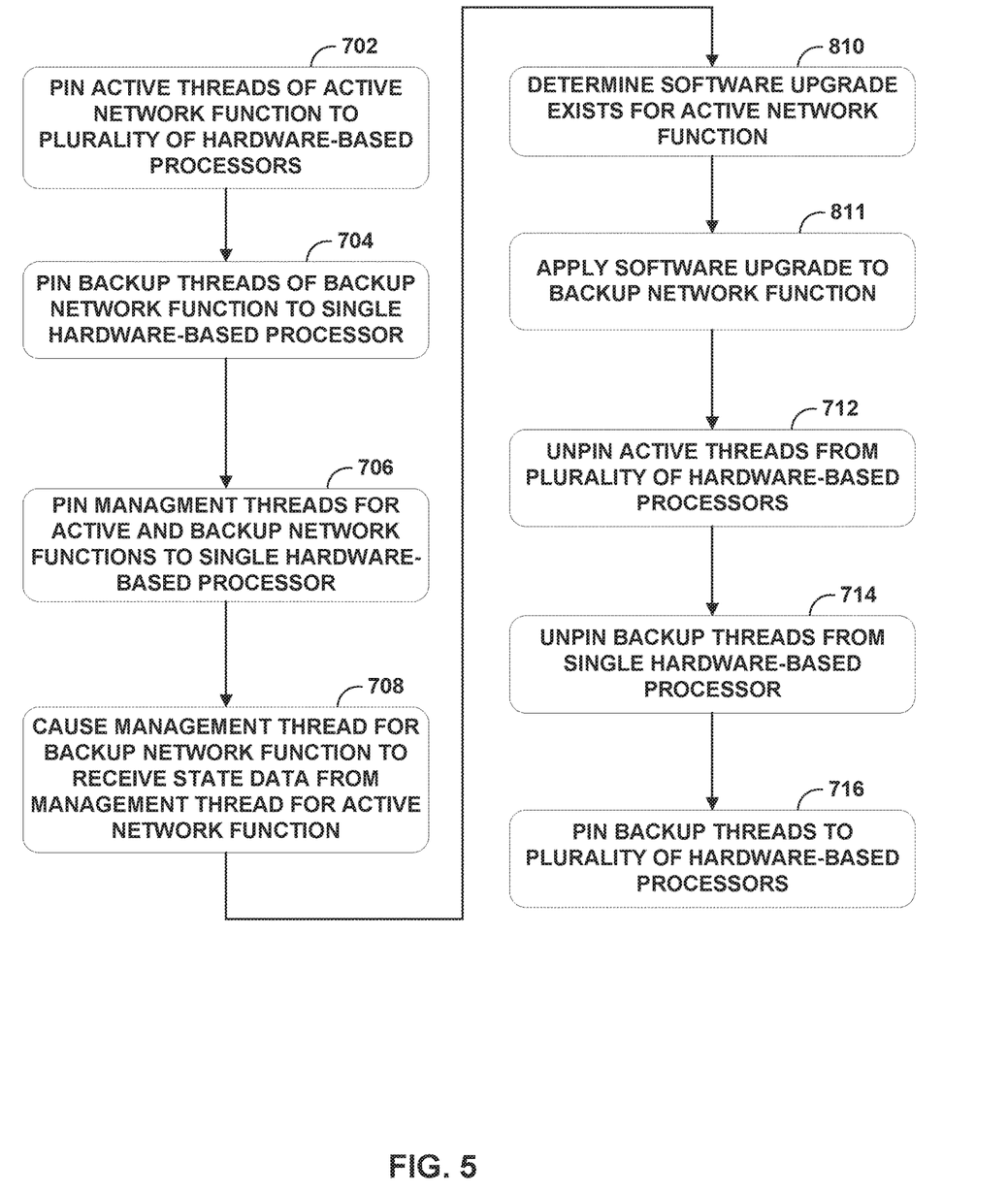
FIG. 5 is a flowchart illustrating an example operation for performing an in-service software upgrade of one or more functions of a line card, in accordance with the techniques of the disclosure.

FIG. 5 is a flowchart illustrating an example operation for performing an in-service software upgrade of one or more functions of a line card, in accordance with the techniques of the disclosure. In the example of FIG. 5, hypervisor 304 pins active threads of the active network function to the plurality of hardware-based processors (702), pins backup threads of the backup network function to the single hardware-based processor (704), pins management threads for active and backup threads to the single hardware-based processor (706), and executes the management thread of the active network function and the management thread of the backup network function to cause the management thread of the backup network function to receive, from the management thread of the backup network function, state data generated by the active threads of the active network function (708). Operations 702, 704, 706, and 708 may occur in a substantially similar fashion to the like operations described above with respect to FIG. 4.

The host process determines that a software upgrade exists for the active network function (810). With respect to FIG. 3, hypervisor 304 determines that a software upgrade exists for a network function provided by VNFs 320. For example, VNFs 320 may provide an active VPN service, and hypervisor 304 determines than a patch, bugfix, update, or other upgrade exists for the active VPN service. In response to detecting that a software upgrade exists for the active network function, the host process applies the software upgrade to the backup network function (811). With respect to the example of FIG. 3, hypervisor 304 applies the software upgrade to the backup VPN service executed by backup VNF instances 320'.

Upon completing the software upgrade of the backup network function, the host process unpins the active threads from the plurality of hardware-based processors (712). In the example of FIG. 3, hypervisor 304 unpins active threads 14 executing the active network function provided by VNFs 320 from data processors 108A-108C. Further, the host process unpins the upgraded backup threads from the single hardware-based processor (714). For example, hypervisor 304 unpins the upgraded backup threads 17 executing the upgraded backup network function provided by VNFs 320' from management processor 108N. The host process pins the upgraded backup threads to the plurality of hardware-based processors (716). For example, hypervisor 304 pins the upgraded backup threads 17 executing the upgraded backup network function provided by VNFs 320' to data processors 108A-108C. Operations 712, 714, and 716 may occur in a substantially similar fashion to the like operations described above with respect to FIG. 4.

Further, hypervisor 304 of the service card 13A unblocks the upgraded backup threads 17 of upgraded VNF instances 320' now pinned to data processors 108A-108C, such that upgraded VNF instances 320' resume execution with transferred state data from active VNFs 320 of VM 360. In this way, hypervisor 304 may perform an ISSU of backup VNFs 320 and then replace the outdated, active VNFs 320 with the upgraded backup VNFs 320' such that the network functions provided by the VNFs remains uninterrupted during the software upgrade.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:
1. A method comprising:
 by a host process executed by an insertable service card of a network device, pinning, to any of a plurality of hardware-based processors of the service card, active threads of an active network function;

by the host process, pinning, to a single hardware-based processor of the service card, a plurality of backup threads of a backup network function for the active network function, wherein the plurality of hardware-based processors of the service card does not include the single hardware-based processor of the service card;

by the host process, pinning, to the single hardware-based processor of the service card, a management thread of the active network function and a management thread of the backup network function; and executing, by the single hardware-based processor of the service card, the management thread of the active network function and the management thread of the backup network function to cause the management thread of the backup network function to receive, from the management thread of the active network function, state data generated by the active threads of the active network function.

2. The method of claim 1, wherein the host process comprises a hypervisor.

3. The method of claim 1, wherein the active network function and backup network function are virtual network functions (VNF).

4. The method of claim 1, wherein the active network function processes packets for network traffic received by the network device.

5. The method of claim 1, wherein pinning, to any of the plurality of hardware-based processors of the service card, the active threads comprises setting a central processing unit (CPU) affinity for each of the active threads to any of the plurality of hardware-based processors, and wherein pinning, to the single hardware-based processor of the service card, the backup threads comprises setting a CPU affinity for each of the backup threads to the single hardware-based processor.

6. The method of claim 1, further comprising:

executing, by the host process, the active network function by a first virtual machine (VM), the first VM comprising a first plurality of virtual CPUs (vCPUs), and executing, by the host process, the backup network function by a second VM, the second VM comprising a second plurality of virtual CPUs (vCPUs).

7. The method of claim 6, further comprising:

inserting, by the host process, the active threads into a plurality of run queues for the any of the plurality of hardware-based processors; and inserting, by the host process, the backup threads into a wait queue for the single hardware-based processor.

8. The method of claim 1, further comprising:

detecting, by the host process, a failure of the active network function;

in response to the detected failure:
  unpinning, by the host process, the active threads from the any of the plurality of hardware-based processors;
  unpinning, by the host process, the backup threads from the single hardware-based processor;
  pinning, by the host process, the backup threads to the any of the plurality of hardware-based processors; and
  pinning, by the host process, the active threads to the single hardware-based processor.

9. The method of claim 8, wherein pinning, to the single hardware-based processor of the service card, the plurality of backup threads further comprises blocking, by the host process, the plurality of backup threads from execution, and wherein the method further comprises, in response to the detected failure:
  blocking, by the host process, the active threads from execution; and
  unblocking, by the host process, the plurality of backup threads from execution.

10. The method of claim 1, further comprising:

determining, by the host process, that a software upgrade is available for the active network function;

in response to determining that the software upgrade is available:
  applying, by the host process, the software upgrade to the backup network function;
  unpinning, by the host process, the active threads from the any of the plurality of hardware-based processors;
  unpinning, by the host process, the backup threads from the single hardware-based processor;
  pinning, by the host process, the backup threads to the any of the plurality of hardware-based processors; and
  pinning, by the host process, the active threads to the single hardware-based processor.

11. A network device comprising:

a network interface card;

an insertable service card coupled to the network interface card, the insertable service card comprising:
  a plurality of hardware-based processors;
  a single hardware-based processor;
  a host process configured for execution by the single hardware-based service card to:
    pin, to any of the plurality of hardware-based processors of the service card, active threads of an active network function;
    pin, to the single hardware-based processor of the service card, a plurality of backup threads of a backup network function for the active network function, wherein the plurality of hardware-based processors of the service card does not include the single hardware-based processor of the service card; and
    pin, to the single hardware-based processor of the service card, a management thread of the active network function and a management thread of the backup network function,
  wherein the management thread of the active network function and the management thread of the backup network function are configured for execution by the single hardware-based processor to cause the management thread of the backup network function to receive, from the management thread of the active network function, state data generated by the active threads of the active network function.

12. The network device of claim 11, wherein the host process comprises a hypervisor.

13. The network device of claim 11, wherein the active network function and backup network function are virtual network functions (VNF).

14. The network device of claim 11, wherein the active network function is configured to process packets for network traffic received by the network device.

15. The network device of claim 11, wherein the host process, to pin, to any of the plurality of hardware-based processors of the service card, the active threads, is further configured to set a central processing unit (CPU) affinity for each of the active threads to any of the plurality of hardware-based processors, and wherein the host process, to pin to the single hardware-based processor of the service card, the backup threads is further configured to set a CPU affinity for each of the backup threads to the single hardware-based processor.

16. The network device of claim 11, wherein the host process is further configured to:

execute the active network function by a first virtual machine (VM), the first VM comprising a first plurality of virtual CPUs (vCPUs), and execute the backup network function by a second VM, the second VM comprising a second plurality of virtual CPUs (vCPUs).

17. The network device of claim 16, wherein the host process is further configured to:

insert the active threads into a plurality of run queues for the any of the plurality of hardware-based processors; and insert the backup threads into a wait queue for the single hardware-based processor.

18. The network device of claim 11, wherein the host process is further configured to:

detect a failure of the active network function;

in response to the detected failure:

unpin the active threads from the any of the plurality of hardware-based processors;

unpin the backup threads from the single hardware-based processor;

pin the backup threads to the any of the plurality of hardware-based processors; and pin the active threads to the single hardware-based processor.

19. The network device of claim 18, wherein the host process, to pin, to the single hardware-based processor of the service card, the plurality of backup threads, is further configured to block the plurality of backup threads from execution, and wherein the host process, in response to the detected failure, is further configured to:

block the active threads from execution; and unblock the plurality of backup threads from execution.

20. The network device of claim 11, wherein the host process is further configured to:

determine that a software upgrade is available for the active network function;

in response to determining that the software upgrade is available:

apply the software upgrade to the backup network function;

unpin the active threads from the any of the plurality of hardware-based processors;

unpin the backup threads from the single hardware-based processor;

pin the backup threads to the any of the plurality of hardware-based processors; and pin the active threads to the single hardware-based processor.

21. A non-transitory computer-readable medium comprising instructions that, when executed, cause a host process configured for execution by an insertable service card of a network device to:

pin, to any of a plurality of hardware-based processors of the service card, active threads of an active network function;

pin to a single hardware-based processor of the service card, a plurality of backup threads of a backup network function for the active network function, wherein the plurality of hardware-based processors of the service card does not include the single hardware-based processor of the service card;

pin to the single hardware-based processor of the service card, a management thread of the active network function and a management thread of the backup network function; and execute the management thread of the active network function and the management thread of the backup network function to cause the management thread of the backup network function to receive, from the management thread of the active network function, state data generated by the active threads of the active network function.

* * * * *